US012374474B2

(12) United States Patent
Eriksson et al.

(10) Patent No.: US 12,374,474 B2
(45) Date of Patent: Jul. 29, 2025

(54) WALL BUSHING

(71) Applicant: Hitachi Energy Ltd, Zürich (CH)

(72) Inventors: Anders Eriksson, Ludvika (SE); Alejandra Ravanal, Uppsala (SE); Christos Athanasopoulos, Borlänge (SE)

(73) Assignee: Hitachi Energy Ltd, Zürich (CH)

( * ) Notice: Subject to any disclaimer, the term of this patent is extended or adjusted under 35 U.S.C. 154(b) by 188 days.

(21) Appl. No.: 18/020,964

(22) PCT Filed: Jun. 3, 2021

(86) PCT No.: PCT/EP2021/064941
§ 371 (c)(1),
(2) Date: Feb. 13, 2023

(87) PCT Pub. No.: WO2022/033742
PCT Pub. Date: Feb. 17, 2022

(65) Prior Publication Data
US 2023/0298784 A1 Sep. 21, 2023

(30) Foreign Application Priority Data
Aug. 12, 2020 (EP) .................................... 20190736

(51) Int. Cl.
*H01B 17/44* (2006.01)
*H01B 17/26* (2006.01)
(Continued)

(52) U.S. Cl.
CPC ........... *H01B 17/44* (2013.01); *H01B 17/265* (2013.01); *H01B 17/583* (2013.01); *H01T 19/02* (2013.01)

(58) Field of Classification Search
CPC .... H01B 17/44; H01B 17/265; H01B 17/583; H01B 7/26; H01B 17/36; H01B 17/42; H01B 17/26; H01T 19/02; H02G 15/24
See application file for complete search history.

(56) References Cited

U.S. PATENT DOCUMENTS 4,202,998 A * 5/1980 Cronin .................. H02G 15/30 174/31 R
4,403,104 A * 9/1983 Dale ...................... H01B 17/26 174/31 R
(Continued)

FOREIGN PATENT DOCUMENTS

CN 105356392 A 2/2016
CN 111480212 A 7/2020
(Continued)

OTHER PUBLICATIONS

English Translation CN111480212; Bartz et al. Published Jul. 31, 2020; Siemens AG (Year: 2020).*
(Continued)

*Primary Examiner* — Steven T Sawyer
(74) *Attorney, Agent, or Firm* — Sage Patent Group

(57) ABSTRACT

A wall bushing for high voltage application is presented. The wall bushing includes a grounded shield. The grounded shield includes a grading ring in a distal end thereof. The grading ring has an elliptic cross section with conjugate diameters, wherein a major diameter of the conjugate diameters is arranged in an axial direction of the grounded shield and a minor diameter of the conjugate diameters is arranged in a radial direction of the grounded shield. The major diameter is larger than the minor diameter.

16 Claims, 3 Drawing Sheets

(51) Int. Cl.
*H01B 17/58* (2006.01)
*H01T 19/02* (2006.01)

(56) References Cited

U.S. PATENT DOCUMENTS

| | | | | |
|---|---|---|---|---|
| 4,458,101 | A | 7/1984 | Cookson et al. | |
| 6,218,627 | B1 * | 4/2001 | Shindo | H01B 17/26 174/142 |
| 6,951,987 | B1 * | 10/2005 | Hansen | H02G 15/24 174/75 D |
| 7,807,930 | B1 * | 10/2010 | Hansen | H01B 17/44 174/152 R |

FOREIGN PATENT DOCUMENTS

| | | | |
|---|---|---|---|
| JP | S51-38692 | A | 3/1976 |
| JP | H11-288629 | A | 10/1999 |
| JP | 2011-229352 | A | 4/2010 |
| WO | 2013113374 | A1 | 8/2013 |

OTHER PUBLICATIONS

English Translation CN105356392; Qian et al. Published Feb. 24, 2016 (Year: 2016).*
Office Action, Japanese Patent Application No. 2023-509797, mailed Aug. 31, 2023, 6 pages.
International Search Report and Written Opinion of the International Searching Authority, PCT/EP2021/064941, mailed Jul. 12, 2021, 10 pages.
Extended European Search Report, European Patent Application No. 20190736.7, mailed Jul. 28, 2021, 6 pages.

* cited by examiner

WALL BUSHING

CROSS REFERENCE TO RELATED APPLICATIONS

This application is a 35 U.S.C. § 371 national stage application of PCT International Application No. PCT/EP2021/064941 filed on Jun. 3, 2021, which in turn claims foreign priority to European Patent Application No. 20190736.7, filed on Aug. 12, 2020, the disclosures and content of which are incorporated by reference herein in their entirety.

TECHNICAL FIELD

The present disclosure relates to a wall bushing with a shield having a grading ring.

BACKGROUND

In a wall bushing current is transferred via a tube at high voltage that passes a grounded wall, which is illustrated in FIGS. 1 and 2. FIG. 1 shows a wall bushing with a partly cut away insulation, and FIG. 2 shows the highlighted part of FIG. 1. A grounded shield 2 is concentrically mounted between the high voltage tube 1 and a grounded flange 5 that is attached in a hole in the wall. The edges of this shield 2 experiences high electric stress and are therefore rounded to reduce the electric stress. However, due to the use of the concentric shield 2 between the high voltage tube 1 and the grounded flange 5, electromagnetic requirements on the grounded flange 5 is greatly relaxed and could possibly even have a square shaped cross section.

The electric stress at the grading ring 3 is limiting the design, particularly for the biggest gas insulated wall bushings, as it is not possible to add support between the high voltage tube 1 and the grounded shield 2 since it would endanger isolation or prevent it completely. There is however a desire to reduce this electric stress. This electric stress is particularly limiting for bushings to be used in sites with seismic requirements, as the high voltage tube without support can move towards the grounded shield.

Details of a typical design of a wall bushing grading ring is shown in further detail in FIG. 3. The grounded shield 2 of the wall bushing is concentrically arranged around the high voltage tube 1. The wall bushing is symmetric around a longitudinal axis thereof, and an end of the grounded shield 2 is illustrated. The grounded shield 2 is tubular, but may have a tapering diameter towards the proximate end configured to allow the use of a grading ring 3 without being arranged closed to the grounded flange 5. A desired safety distance x is illustrated between the grading ring 3 and the grounded flange 5. About the same distance is also used between the grounded shield 2 and the grounded flange 5. The proximate end of the grounded shield 2 is provided with a rounded edge or grading ring 3 with a circular cross section 4. The grading ring is configured to withstand a rated electric stress for the wall bushing.

At seismic activity the conductor tube 1 may move in a radial direction, i.e. off centre in relation to the shield 1, enhancing the electric stress of the grading ring 3. Wall bushings to be used in sites with seismic requirements are rated to withstand a rated electric stress also for the conductor tube being moved to an off-centre position to a certain degree.

SUMMARY

One objective of the invention is to reduce the electrical stress of a wall bushing.

According to an aspect of the invention there is presented a wall bushing for high voltage application. The wall bushing comprises a grounded shield. The grounded shield comprises a grading ring in a distal end thereof. The grading ring has an elliptic cross section with conjugate diameters. A major diameter of the conjugate diameters is arranged in an axial direction of the grounded shield and a minor diameter of the conjugate diameters is arranged in a radial direction of the grounded shield. The major diameter is larger than the minor diameter.

The major diameter may be between 10 and 55% longer than the minor diameter. The major diameter may be between 15 and 40% longer than the minor diameter. The major diameter may be between 18 and 34% longer than the minor diameter.

The shield may be elongated and concentric around a longitudinal axis.

The wall bushing may be a gas insulated wall bushing.

The grading ring may be made of Aluminium.

The wall bushing may be configured to be arranged with the shield concentrically arranged around a high voltage tube.

By providing a wall bushing with a grading ring having an elliptic cross section, wherein the major axis of the elliptic cross section is arranged in an axial direction of the wall bushing, a reduced electrical stress of the wall bushing is achieved. The elliptic shape enables higher rated voltage and/or compacter design than traditional grading rings of circular cross section.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
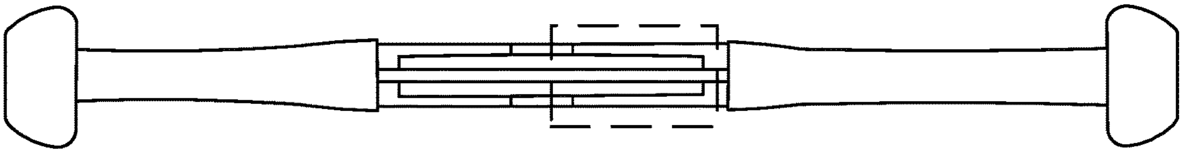
FIG. 1 is a diagram schematically illustrating a wall bushing.
Figure 2:
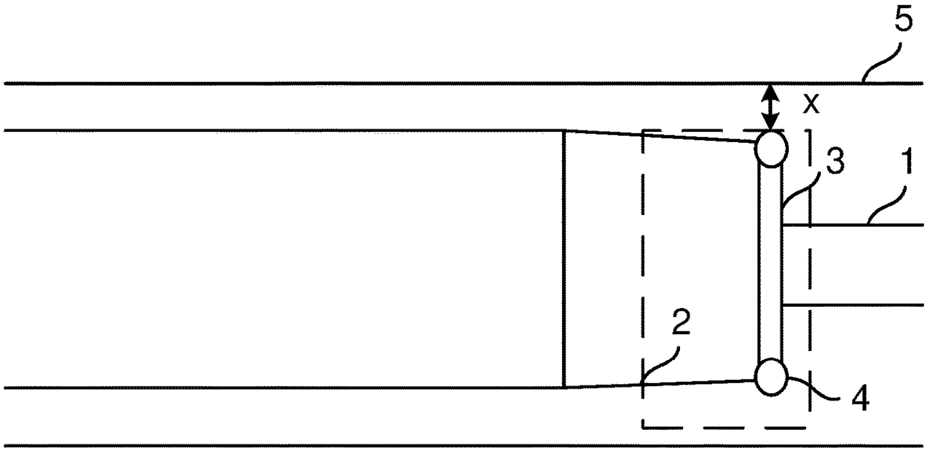
FIG. 2 is a diagram schematically illustrating a detail of the wall bushing shown in FIG. 1 with a circular cross section of a grading ring.
Figure 4:
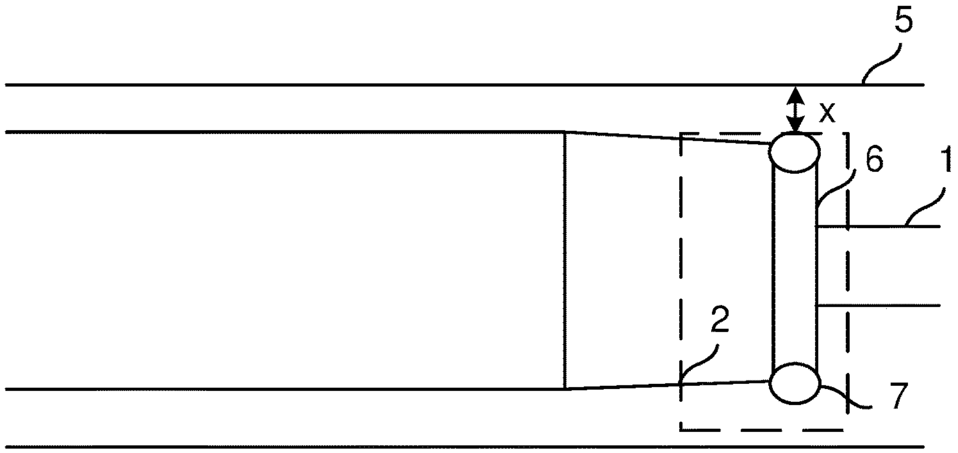
FIG. 4 is a diagram schematically illustrating a detail of a wall bushing with an elliptic cross section.
Figure 3:
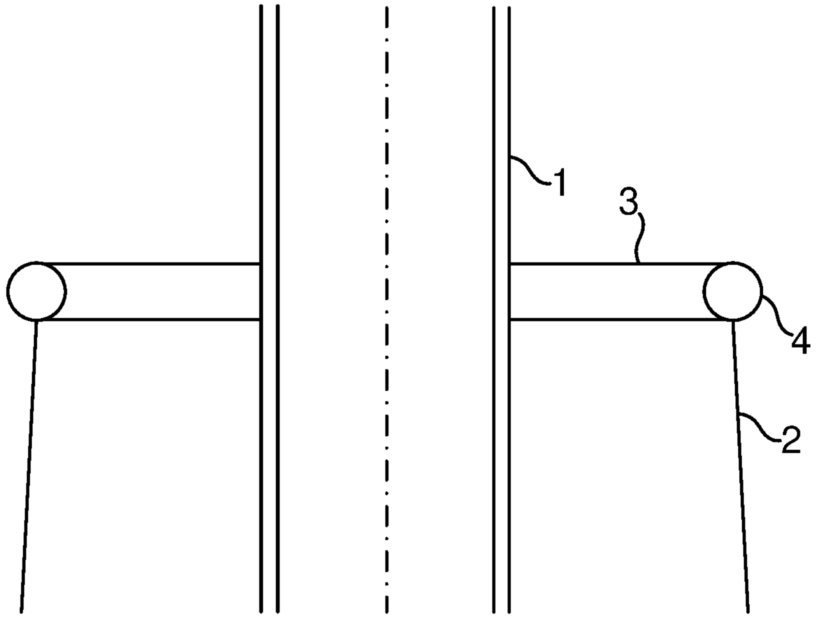
FIG. 3 is a diagram schematically illustrating a cross section of part of FIG. 2.
Figure 5:
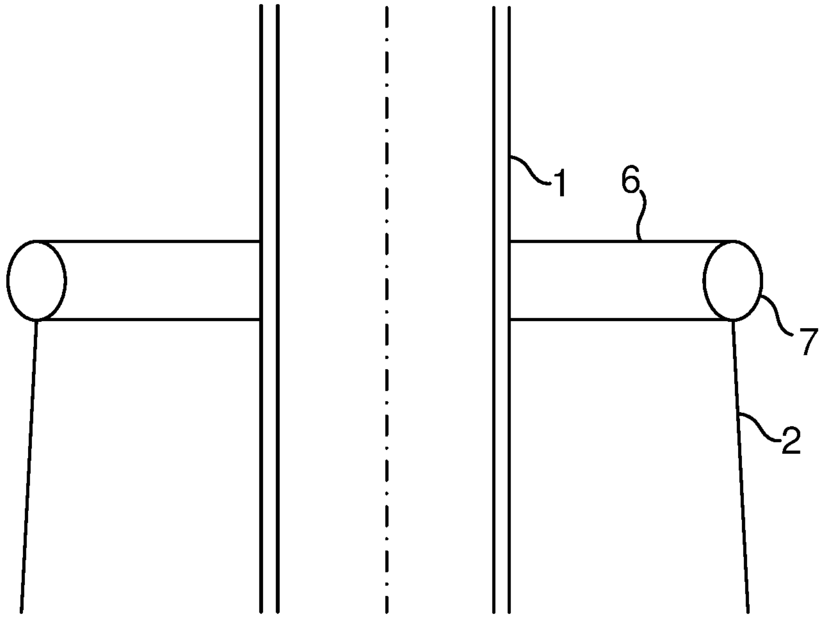
FIG. 5 is a diagram schematically illustrating a cross section of part of FIG. 4.

A wall bushing grading ring with an elliptic cross section is according to an aspect presented with reference to FIGS. 4 and 5. FIGS. 4 and 5 show a typical grounded shield 2 in a wall bushing similar to the one illustrated in FIGS. 1-3. The same reference numbers have been used for other parts then the grading ring 6 and its cross section 7. An elliptic shape of the cross section 7 of the grading ring 6 enables the wall bushing to be rated for higher voltage and/or to be designed in a more compact design than for wall bushings with traditional grading rings of circular cross section. The configuration of the grading ring is presented, and other details of the wall bushing is within the knowledge of a person skilled in the art of wall bushings.

The wall bushing is configured for high voltage application. The wall bushing comprises a grounded shield 2. The grounded shield 2 comprises a grading ring 6 in a distal end thereof. The grading ring 6 has an elliptic cross section 7 with conjugate diameters. A major diameter of the conjugate diameters is arranged in an axial direction of the grounded shield 2 and a minor diameter of the conjugate diameters is arranged in a radial direction of the grounded shield 2. The major diameter is larger than the minor diameter. The shortest distance between the grading ring 6 and the grounded flange 5 is x, which is about the same distance as the between the grounded shield 2 and the grounded flange 5.

The major diameter may be between 10 and 55% longer than the minor diameter. The major diameter may further be between 15 and 40% longer than the minor diameter. The major diameter may yet further be between 18 and 34% longer than the minor diameter.

The grounded shield 2 may be elongated and concentric around a longitudinal axis, as illustrated with a dot-dashed line.

The wall bushing may be a gas insulated wall bushing. A typical gas insulated wall bushing for high power DC bushings uses SF6 gas for isolation. For the highest voltages, about 150 kV-1500 kV, SF6 gas is particularly useful for its electrical isolation properties.

The wall bushing may be configured to be arranged with the grounded shield 2 concentrically arranged around the high voltage tube 1.

Figure 6:
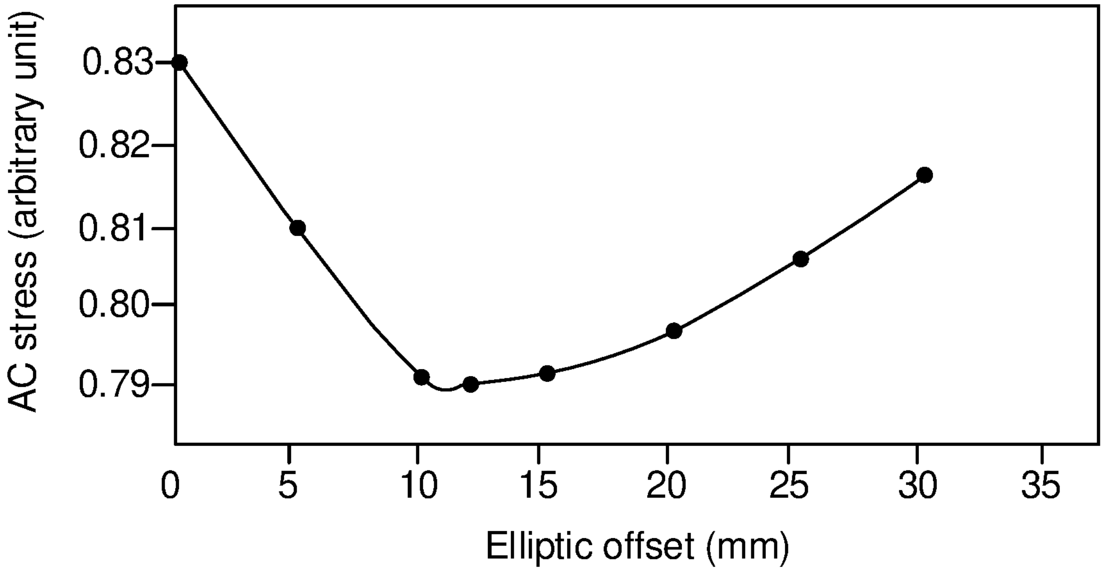
FIG. 6 is a diagram schematically illustrating how the electric stress in a grading ring is affected by the shape of the cross section of the grading ring.

FIG. 6 shows a test of electric stress for wall bushings as presented with reference to FIGS. 4 and 5, with different shapes of the elliptic cross section 7. Tests have been made for a wall bushing configured for a high voltage, in this case 1100 kV DC, with a grading ring 6 with an elliptic cross section 7 diameter of 50 mm. The grading ring 6 is arranged about 200 mm from the conductor tube 1 and about 200 mm (x in this example) from the grounded flange 5. In FIG. 6 the AC stress in arbitrary units is plotted against an elliptic grading ring with different cross section shapes. The cross section of the grading ring has a major axis along the axial direction of the wall bushing and a minor axis along the radial direction of the wall bushing. For wall bushing configured for higher voltage the distances are longer between the grading ring and the conductor tube and the grounded flange, respectively. Correspondingly, the distances are shorter for lower voltages.

The elliptic offset is distance in mm that the major axis is longer than the minor axis. For zero offset, i.e., for a circular cross section, the electric stress is 0.83. With a major axis of 55 mm (the minor axis is constantly 50 mm) the electric stress is 0.81. With a major axis of 60 mm the electric stress is 0.79. With a major axis of 62 mm the electric stress is 0.79. With a major axis of 65 mm the electric stress is 0.79. With a major axis of 70 mm the electric stress is 0.80. With a major axis of 75 mm the electric stress is 0.81. With a major axis of 80 mm the electric stress is 0.82.

The elliptic profile in this embodiment comprises aluminium, but may be made of other electrically conductive materials. The elliptic profile may further be made by a ring with an electrically conductive surface. Other parts of the grounded shield may also comprise aluminium of other electrically conductive materials.

The lowest electric stress is achieved with a cross section having the major axis being about 20-30% longer than the minor axis. A substantially lower electric stress is achieved with a cross section having the major axis being about 15-40% longer than the minor axis. A clearly usefully lower electric stress is achieved with a cross section having the major axis being about 15-55% longer than the minor axis.

Embodiments of the present invention may be described in any one of the following points.

1. A wall bushing for high voltage application, the wall bushing comprising a grounded shield 2, the grounded shield comprising a grading ring 6 in a distal end thereof, the grading ring having an elliptic cross section 7 with conjugate diameters, wherein a major diameter of the conjugate diameters is arranged in an axial direction of the grounded shield and a minor diameter of the conjugate diameters is arranged in a radial direction of the grounded shield, wherein the major diameter is larger than the minor diameter.
2. The high voltage wall bushing according to point 1, wherein the major diameter is between 10 and 55% longer than the minor diameter.
3. The high voltage wall bushing according to point 2, wherein the major diameter is between 15 and 40% longer than the minor diameter.
4. The high voltage wall bushing according to point 3, wherein the major diameter is between 18 and 34% longer than the minor diameter.
5. The high voltage wall bushing according to any one of points 1 to 4, wherein the shield is elongated and concentric around a longitudinal axis.
6. The high voltage wall bushing according to any one of points 1 to 5, wherein the wall bushing is a gas insulated wall bushing.
7. The high voltage wall bushing according to any one of points 1 to 6, wherein the grading ring is made of Aluminium.
8. The high voltage wall bushing according to any one of points 1 to 7, wherein the wall bushing is configured to be arranged with the shield concentrically arranged around a high voltage tube 1.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A wall bushing for high voltage application, the wall bushing comprising a grounded shield, the grounded shield comprising a grading ring in a distal end thereof, the grading ring having an elliptic cross section with conjugate diameters, wherein a major diameter of the conjugate diameters is arranged in an axial direction of the grounded shield and a minor diameter of the conjugate diameters is arranged in a radial direction of the grounded shield, wherein the major diameter is larger than the minor diameter, wherein the major diameter is between 10 and 55% longer than the minor diameter, and wherein a shortest distance between the grading ring and a grounded flange comprises about a same distance between the grounded shield and the grounded flange.

2. The high voltage wall bushing according to claim 1, wherein the major diameter is between 15 and 40% longer than the minor diameter.

3. The high voltage wall bushing according to claim 2, wherein the major diameter is between 18 and 34% longer than the minor diameter.

4. The high voltage wall bushing according to claim 1, wherein the grounded shield is elongated and concentric around a longitudinal axis.

5. The high voltage wall bushing according to claim 1, wherein the wall bushing is a gas insulated wall bushing.

6. The high voltage wall bushing according to claim 1, wherein the grading ring is made of Aluminium.

7. The high voltage wall bushing according to claim 1, wherein the wall bushing is configured to be arranged with the grounded shield concentrically arranged around a high voltage tube.

8. A high voltage wall bushing comprising:

a grounded shield that includes a grading ring in a distal end thereof, wherein a major diameter of conjugate diameters related to the grading ring is arranged in an axial direction of the grounded shield and a minor diameter of conjugate diameters related to the grading ring is arranged in a radial direction of the grounded shield, wherein the major diameter is larger than the minor diameter, wherein the major diameter is between 10 and 55% longer than the minor diameter, and wherein a shortest distance between the grading ring and the grounded flange comprises about a same distance between the grounded shield and the grounded flange.

9. The high voltage wall bushing according to claim 8, wherein the grading ring includes an elliptic cross section with the conjugate diameters.

10. The high voltage wall bushing of claim 8, wherein the major diameter is between 15 and 40% longer than the minor diameter.

11. The high voltage wall bushing according to claim 8, wherein the major diameter is between 18 and 34% longer than the minor diameter.

12. The high voltage wall bushing according to claim 8, wherein the grounded shield is elongated and concentric around a longitudinal axis.

13. The high voltage wall bushing according to claim 8, wherein the wall bushing is a gas insulated wall bushing.

14. The high voltage wall bushing according to claim 8, wherein the grading ring comprises Aluminium.

15. The high voltage wall bushing according to claim 8, wherein the wall bushing is configured to be arranged with the grounded shield concentrically arranged around a high voltage tube.

16. The high voltage wall bushing according to claim 8, wherein the wall bushing comprises a gas insulated wall bushing, and wherein the grading ring comprises Aluminium.

* * * * *